Lewis B. Hunt's Im'd Car Wheel.
No. 11,696. Fig. 1. PATENTED JUL 11 1854
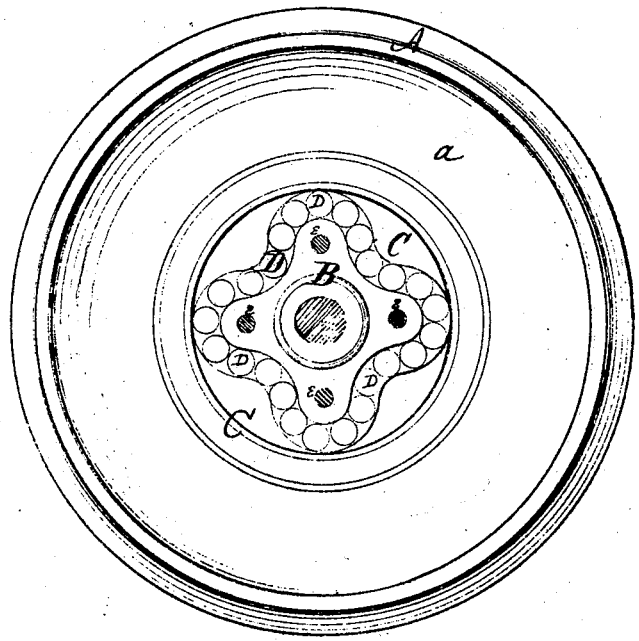
Fig. 2.
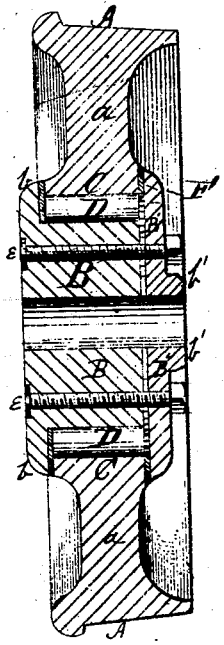
Witnesses.
E. F. Kastenhuber
C. Wahlers
Inventor.
Lewis B. Hunt
per
Van Santvoord & Hauff

UNITED STATES PATENT OFFICE.

LEWIS B. HUNT, OF NEW YORK, N. Y.

IMPROVEMENT IN CAR-WHEELS.

Specification forming part of Letters Patent No. 116,961, dated July 11, 1871.

*To all whom it may concern:*

Be it known that I, LEWIS B. HUNT, of the city, county, and State of New York, have invented an Improved Car-Wheel; and I do hereby declare the following to be a full, clear, and exact description of the same, reference being had to the accompaning drawing forming part of this specification, in which—

Figure 1 represents a side elevation, the plate G having been removed; and Fig. 2 is a vertical cross-section through the center of the wheel.

Similar letters of reference in the accompanying drawing indicate corresponding parts.

Letters Patent of the United States were granted to me November 30, 1869, No. 97,407, for a car-wheel having the rim and hub made in independent parts, with an annular cushion of rubber cylinder interposed between them. It has been found in practice that the wheel is unnecessarily heavy, and the rim slips too much upon the hub. For the purpose of obviating the difficulties referred to and producing, as a new article of manufacture, a car-wheel of improved construction, I have invented the wheel which I will now proceed to describe.

In the drawing, A *a* C represent the independent rim, A being the tread, *a* the thin web, and C the expanded inner edge, adapted to fit into the hub and rest upon the elastic cylinder D D. B B' represent the hub, which is made in two parts bolted together at *e e* with a thin elastic cushion, F, interposed between them. The part B is rabbeted to receive the cylinder and the base of the rim, as shown in Fig. 1, and is made of a thickness equal to the length of the cylinder, (or its equivalent, the width of the part C,) together with the thickness of the flange *b*, and of a thin packing between the part *b* and the parts C D.

The weight of the car is therefore supported entirely by the part B, which is cast thick and very strong, and the thinner plate B' is adapted merely to hold the cylinders and rim in place. The form of the plate B' as represented is important. A narrow annular plate, not supported by the axle nor cast with central strengthening-rib, is liable to break, and if it gives way at one of the bolts, or if the bolt gives way, or a nut becomes detached, the plate is not strong enough to maintain its place and the car is smashed. By casting the plate solid from its periphery to the axle and forming the boss or strengthening-rib *b'* thereon immediately around the central opening, the plate is rendered much less liable to transverse fracture, and is strong enough to maintain its position and answer its purpose, even if one of the bolts should break, or if any local fracture should take place. The plate is pressed upon the axle so as to hold firmly, which also assists to support it.

Having thus described my invention, what I claim as new, and desire to secure by Letters Patent, is—

A car-wheel, combining an independent rim, a hub, and an irregular row of elastic cylinders interposed between them, when constructed as described—that is to say, having the hub made in two parts, B B', each bearing upon the axle, one of said parts, B, supporting the whole width of the rim C, and also supporting the rim laterally on the inner side at *b*, and the other part, B', supporting the rim laterally on the other side, substantially as described.

LEWIS B. HUNT.

Witnesses:
W. HAUFF,
E. F. KASTENHUEBER.